(12) United States Patent
Hornung et al.

(10) Patent No.: US 10,007,857 B2
(45) Date of Patent: *Jun. 26, 2018

(54) METHOD FOR THE THREE-DIMENSIONAL DETECTION OF OBJECTS

(71) Applicant: SICK AG, Waldkirch/Breisgau (DE)

(72) Inventors: Armin Hornung, Freiburg (DE); Matthias Neubauer, Freiburg (DE)

(73) Assignee: SICK AG, Waldkirch/Breisgau (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/258,033

(22) Filed: Sep. 7, 2016

(65) Prior Publication Data
US 2017/0068856 A1 Mar. 9, 2017

(30) Foreign Application Priority Data
Sep. 8, 2015 (EP) ..................... 15184182

(51) Int. Cl.
*G06K 9/62* (2006.01)
*G06K 9/20* (2006.01)
(Continued)

(52) U.S. Cl.
CPC ......... *G06K 9/2036* (2013.01); *G06K 9/3233* (2013.01); *G06K 9/6211* (2013.01);
(Continued)

(58) Field of Classification Search
CPC ...... G06F 3/011; G06F 3/0346; G06F 3/0304; G06K 9/00221; G06K 9/00335; G06K 9/00369; G08C 17/00; G08C 17/02; H04N 5/2226; A63F 13/213; A63F 13/24; A63F 13/426; A63F 13/428; A63F 13/655; A63F 13/00; G06T 7/73
See application file for complete search history.

(56) References Cited

U.S. PATENT DOCUMENTS

| 6,215,898 B1 | 4/2001 | Woodfill et al. |
| 2010/0073461 A1 | 3/2010 | Hammes et al. |

(Continued)

FOREIGN PATENT DOCUMENTS

| DE | 10 2006 001 634 B3 | 3/2007 |
| EP | 2 019 281 A1 | 1/2009 |

(Continued)

OTHER PUBLICATIONS

Kang Zhang et al: "Binary Stereo Matching", 21st International Conference on Pattern Recognition (ICPR 2012), Nov. 11-15, 2012, Tsukuba, Japan, pp. 356-359, XP032329341.

(Continued)

*Primary Examiner* — Duy M Dang
(74) *Attorney, Agent, or Firm* — Nath, Goldberg & Meyer; Jerald L. Meyer

(57) ABSTRACT

The present invention relates to a method for the three-dimensional detection of objects in which two images of a scene are detected and mutually corresponding objects in the images are identified by means of a correlation process. A binarization scheme which compares randomly selected point pairs with one another is used in the correlation process. The point pairs are fixed by means of a plurality of iterations.

18 Claims, 2 Drawing Sheets

Figure 1:
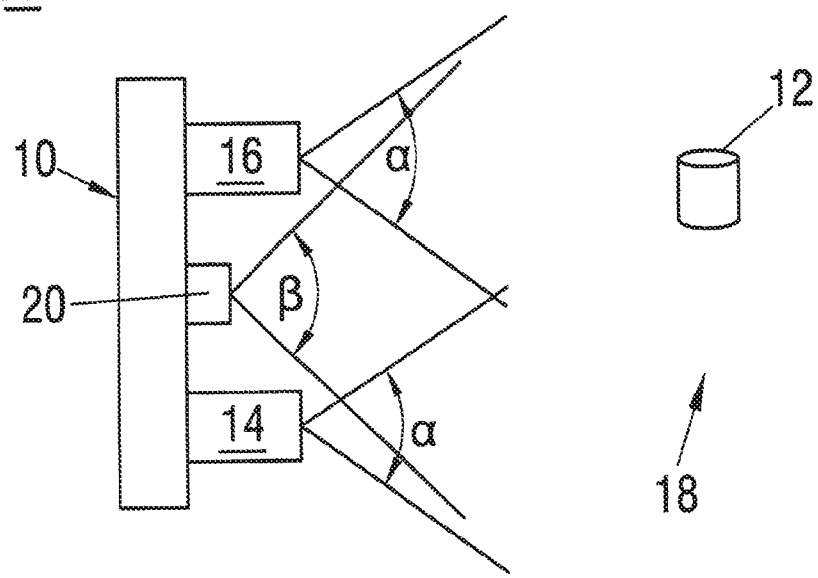

(51) Int. Cl.
  *G06T 7/521* (2017.01)
  *G06T 7/593* (2017.01)
  *G06K 9/32* (2006.01)

(52) U.S. Cl.
  CPC .............. *G06T 7/521* (2017.01); *G06T 7/593* (2017.01); *G06K 2209/401* (2013.01); *G06T 2207/10012* (2013.01)

(56) References Cited

U.S. PATENT DOCUMENTS

| 2012/0293625 A1 | 11/2012 | Schneider et al. |
| 2013/0100256 A1 | 4/2013 | Kirk et al. |
| 2017/0068856 A1* | 3/2017 | Hornung ................. G06T 7/521 |

FOREIGN PATENT DOCUMENTS

| EP | 2 166 304 A1 | 3/2010 |
| EP | 2 166 305 A1 | 3/2010 |
| EP | 2 772 676 A1 | 9/2014 |

OTHER PUBLICATIONS

Michael Calonder et al: "Brief: Computing a Local Binary Descriptor Very Fast", IEEE Transactions on Pattern Analysis and Machine Intelligence, vol. 34, No. 7, Jul. 2012, pp. 1281-1298, XP011444694.

Ethan Rublee et al: "ORB: An efficient alternative to SIFT or SURF", 2011 IEEE International Conference on Computer Vision (ICCV), Nov. 6, 2011, pp. 2564-2571, XP032101497.

Tomasz Trzcinski et al: "Learning Image Descriptors with Boosting", IEEE Transaction on Pattern Analysis and Machine Intelligence, IEEE Computer Society, vol. 37, No. 3, Mar. 1, 2015, pp. 597-610, XP 01157406.

Juha Ylioinas et al: "Learning Local Image Descriptors Using Binary Decision Trees", IEEE Winter Conference on Applications of Computer Vision, IEEE Mar. 24, 2014, pp. 347-354, XP032609970.

Search report issued in corresponding European application No. 15184182.2-1906 dated Mar. 21, 2016.

Official letter issued in corresponding European application No. 15184182.2-1906 dated Nov. 11, 2016.

* cited by examiner

METHOD FOR THE THREE-DIMENSIONAL DETECTION OF OBJECTS

The present invention relates to a method for the three-dimensional detection of objects in which a scene is detected by means of a first image detection device, wherein a first image is produced. In addition, the scene is also detected by means of a second image detection device, wherein a second image is produced. A correlation window is subsequently fixed as a portion of the first image and a plurality of search windows are fixed as portions of the second image, wherein different search windows reproduce different regions of the second image. Following this, the search window corresponding to the correlation window is determined by means of a correlation process.

Methods for the three-dimensional detection of objects are generally known and are used e.g. in applications of machine vision to detect and to recognize objects, persons and the like. The position of a person in the space or even the positions of individual appendages (e.g. of the hands) of the person can, for example, be determined by means of such methods.

For this purpose, a scene can be detected using two different image detection devices, wherein the image detection devices are arranged spaced apart from one another. Two images are produced by means of the image detection devices and an object to be detected, for example, is shown in said images at different positions in the images due to the offset of the image detection devices.

A correlation window can be fixed as the portion of one of the images, wherein the correlation window preferably includes the object to be detected. Subsequently, that search window in which the object to be detected is likewise visible in the other image can be determined in a correlation process by the use of a plurality of search windows.

An angle of the first and second image detection devices with respect to the object can be determined on the basis of the different positions of the object to be detected in the first and second images, whereupon the spacing of the object from the image detection devices, and thus the spatial position of the object, can be determined by means of triangulation.

The so-called census method can be used as the correlation process, for example, in which the brightness of different pixels is compared with a respective central pixel within the correlation window. A binary value is formed for each comparison from the respective comparisons with the central pixel, wherein a census vector is formed from all binary values which describes the relative brightness distribution or grayscale distribution in the search window. The produced census vectors can then be compared with one another in the correlation process, for example, to locate the same object in the first and second images with as much confidence as possible.

Alternatively to the census method, the so-called BRIEF method can e.g. also be used which is described in "Calonder et al.—BRIEF: Computing a Local Binary Descriptor Very Fast. IEEE Transactions on Pattern Analysis and Machine Intelligence 2012" and "Zhang et al.—Binary stereo matching. ICPR 2012".

Very large correlation windows and very long census vectors are required in order e.g. to provide a good correlation between the correlation window (first image) and the corresponding search window (second image) by means of the census method. However, large correlation windows degrade the object resolution, whereby small objects can no longer be recognized or can only be recognized with difficulty. In addition, with large correlation windows, a large number of point comparisons have to be carried out, whereby the computing effort for the carrying out of such a method increases greatly. A carrying out of the method in real time can in particular no longer be possible due to the large computing effort.

It is the underlying object of the invention to provide a method for the three-dimensional detection of objects which also allows a reliable detection of small objects and nevertheless manages with a small computing effort.

This object is satisfied by a method in accordance with claim 1. The method steps will be explained in more detail in the following.

In accordance with the invention, the method is characterized in that a binarization scheme is applied to the correlation window and to the search windows in the correlation process, in which binarization scheme the respective points of at least one randomly selected point pair within the correlation window and within the search windows are compared with one another, wherein a respective results vector is formed for the correlation window and for the search windows. The method in accordance with the invention is additionally characterized in that a correlation of the results vector of the correlation window and of the results vectors of the search windows takes place to determine the search window corresponding to the correlation window. The results vector of the correlation window can e.g. be compared with the results vectors of the search windows in the correlation.

In this respect, randomly selected point pairs within the correlation window are first compared with one another. The brightness of the two points of the point pair can thus, for example, be compared on the use of grayscale values, wherein a binary value is produced in dependence on the brightness difference and is integrated into the results vector of the correlation window. The length of the results vector can correspond to the number of the point pairs or to the number of the point comparisons carried out within the correlation window. The results vector therefore has at least the length one. A brightness distribution in the correlation window can e.g. be imaged onto the results vector by means of such point comparisons.

As in the correlation window in the first image, the explained point comparisons are also carried out within the search windows in the second image, wherein the same point comparisons are carried out in each search window as in the correlation window. This means that the same respective relative positions in the correlation window and in the search windows are compared with one another. Consequently, the results vectors of the search windows and the results vector of the correlation window can have the same length.

In addition, the correlation window and the search windows can have the same size (that is the same area). The correlation window and the search windows can each be selected as rectangular and/or congruent.

The invention makes use of the recognition that a results vector can be produced by means of the random distribution of the point pairs which describes the respective correlation window or the respective search window in detail and significantly. It is therefore possible also to use smaller correlation windows which can lower the computing effort for carrying out the method. Small objects can thus also be reliably detected and located again in the first and second images, whereby the possibility is provided to determine a three-dimensional position of the object by means of triangulation. The method in accordance with the invention thus does not require any complex and/or expensive hardware in order also to be able to detect small objects reliably.

Hardware costs and computing time can consequently be saved since the method in accordance with the invention can better utilize the data generated by existing hardware.

Starting from the described correlation process, a depth value or a depth offset can therefore be determined for the central point of the correlation window and of the search window corresponding to the correlation window and is entered into a depth map. The depth value or the spatial position can in this respect, as already described, be calculated by means of triangulation.

The at least one point pair is particularly preferably selected by means of a plurality of iterations, wherein the at least one point pair is reselected randomly for each iteration and that at least one point pair is used for the correlation process which achieves the best association between the correlation window and the search window corresponding to the correlation window.

In other words, different arrangements of point pairs are compared with one another to find that point pair or those point pairs which achieves/achieve the best correlation between the correlation window and the corresponding search window. The carrying out of the iterations can in this respect already take place in the development process, that is before the detection of the scene. 128 randomly selected point pairs can be used for this purpose in a first iteration, wherein these point pairs are used for the correlation window and for the search windows and a degree of correlation between the correlation window and the search window corresponding to the correlation window is detected, for example. In subsequent iterations, 128 point pairs are e.g. again respectively randomly selected and are again applied to the same correlation window and to the same search window (as in the first iteration). Finally, those point pairs can be used for the method which have the best degree of correlation between the correlation window and the search window corresponding to the correlation window.

The reliability and accuracy of the detection of small objects can in particular be considerably increased by means of the iterations since an optimization of the selected point pairs takes place by the iterations. Alternatively or additionally, not only a correlation window can be examined using the point pairs of each iteration, but a plurality of correlation windows, preferably all the possible correlation windows (and thus the associated search windows) can rather also be examined to find the point pairs which achieve the best association between the correlation window and the associated search window. Due to the better association (i.e. correlation) between the correlation window and the search window corresponding to the correlation window which can thus be achieved, a denser depth map can also be produced which can additionally have less noise.

Advantageous further developments of the invention can be seen from the description, from the dependent claims and from the drawings.

In accordance with a first advantageous embodiment, the at least one point pair is selected, in particular randomly, before the detection of the scene, wherein the point pair is the same for each window. In other words, the point pair can already be selected of fixed in the development process of a system for the three-dimensional detection of objects which the method in accordance with the invention carries out. The point pair or point pairs then remains/remain the same for the service life of the system. This means that the effort for fixing the point pair is transposed into the development process of the system, whereby e.g. no computing power of the system has to be applied during the carrying out of the method.

A plurality of point pairs are preferably used which are distributed uniformly within the correlation window. In other words, the points of the point pairs are distributed substantially uniformly over the area of the correlation window and thus also over the area of the search windows. This means that the point pairs are admittedly selected randomly (that is not in accordance with a predefined rule), but nevertheless have to satisfy the named conditions of uniform distribution and are thus distributed uniformly within the correlation window.

In accordance with a further advantageous embodiment, at least 128 point pairs are selected. The respective same 128 point comparisons are e.g. therefore carried out within the correlation window and the search windows. The results vectors then accordingly e.g. have the length 128 bits.

In accordance with an alternative embodiment, an upper limit of the number of point pairs can also be defined. A maximum of 64, 128, 256 or 512 point pairs can thus be selected, for example. The selection of exactly 128 point pairs in particular provides a good compromise between a significant description of the correlation window or of the search windows by the results vectors and the required computing power.

A respective point (i.e. a pixel) can also be compared with a plurality of different points in the selection of the point pairs. In other words, a point can also be included in one or more other point pairs.

The iterations are further preferably carried out with reference to a first image and to a second image of at least one known scene. A known scene is to be understood such that at least some, preferably all, of the objects present in the scene, and thus also the objects imaged on the images, are known. This means that the spatial positions of the objects are likewise known, whereby the search window corresponding to a respective correlation window is also known in advance. The possibility results from this of checking the correctness of the results achieved in the iterations. The iterations can also be called a simulation, wherein the simulation—as mentioned—can already take place in the development phase and can in particular be carried out purely in software. The use of a known scene makes it possible to again improve the results of the iterations, whereby an association between the correlation window and the corresponding search window can be further optimized, which in turn results in an improved depth map and less noise.

In accordance with a further advantageous embodiment, the scene is illuminated with a pattern which is preferably at least locally non-self similar. This means that the scene is illuminated with a pattern whose pattern structures repeat at the earliest at a specific distance or outside the search region. The non-self similar pattern structures can make it simpler to identify mutually corresponding image regions in the first and second images, whereby the correlation of the correlation window and of the search window corresponding to the correlation window can be facilitated. The use of periodical structures or of line patterns is, however, generally not precluded.

The illumination preferably takes place using infrared light, in particular infrared laser light, such that the illumination is not perceptible for the human eye. The illumination can e.g. only take place in that time period in which the image detection devices detect the scene. The scene can in particular be illuminated from two different spatial directions using at least two illumination devices. The influence of reflective surfaces can be reduced in this manner. The pattern of the illumination can additionally vary in space and time.

The point pairs can in particular be adapted to the illumination on the carrying out of iterations for determining the ideal point pairs. In this respect, the combination of iterations and non-self similar illumination can cause a highly synergistic effect which can greatly increase the reliability and precision (i.e. the degree) of the correlation of the correlation window and of the associated search window.

In accordance with a further advantageous embodiment, the illumination pattern is also varied in the iterations. A further parameter can thus be varied, in addition to the selection of the point pairs, which allows an even better optimization. The optimization can generally take place in the iteration in accordance with the best correlation between the correlation window and the search window corresponding to the correlation window. Alternatively, those point pairs and/or that pattern of the illumination can also be selected which produce or produces the densest depth map, that is which deliver or delivers the greatest valid depth information for the entire scene and/or which produce or produces the smallest error in the depth maps.

In accordance with a further advantageous embodiment, the correlation window and the search windows comprise the same area, with the area being less than 0.5%, preferably less than 0.1%, particularly preferably less than 0.01%, of the area of the first and/or second images. The correlation windows and the search windows can, for example, have a size of 5×5 pixels. With a VGA resolution of the image detection devices (640×480 pixels), 5×5 pixels correspond to 0.0081% of the area of the respective image. Alternatively, the size of the correlation window and of the search windows can be selected such that an object of 40 mm in size can, for example, still be recognized in the scene.

The correlation window and the search window can be formed as rectangular or square, for example. The correlation window and the search window are preferably circular. This means that the point pairs are only arranged within a circular area in the correlation window and in the search windows. The circular area can, for example, have a radius of 2.3 pixels. A sharpening of the edges of small objects results from the use of a circular area, which increases the capability of the method to in particular easily detect small objects. A similar effect is achieved, for example, by the use of rectangular, in particular square, correlation windows or search windows in which then only those pixels are selected which are remote from the respective window center within a corresponding radius. The circle radius can in this respect result from the extent of the minimal object resolution in pixels.

In accordance with a further advantageous embodiment, the correlation of the results vector of the correlation window and of the results vectors of the search windows takes place with reference to the Hamming distance of the results vectors. The Hamming distance can be defined as the number of different points in two respective results vectors. The results vectors used in the method only comprise binary values so that the results vector of the correlation window and the results vector of a search window, which differs from the results vector of the correlation window at three positions, has a Hamming distance of three. That search window whose results vector has the smallest Hamming distance from the results vector of the correlation window is considered the search window corresponding to the correlation window.

In accordance with a further advantageous embodiment, an aggregate is formed over a plurality of Hamming distances, for example over 3×3 Hamming distances for adjacent correlation windows. In addition, the correlation preferably takes place using the aggregate. A smoothing takes place by means of the aggregate, that is by means of the summing, of e.g. nine Hamming distance values within the 3×3 region selected by way of example, whereby a more reliable object recognition can be achieved.

The first image and the second image are preferably rectified and/or filtered by a noise filter. Geometric distortion in the image data is eliminated during rectification. In this manner, the images can be shaped such that the epipolar line for each image extends along the pixels of one image row after the rectification.

The centers of the images (or of the corresponding detected regions) detected by the image detection devices as well as a position, that is a point, which is defined by an object, together span a so-called epipolar plane. The epipolar plane intersects the first and second images in each case in a straight line, the so-called epipolar line.

The noise filter is preferably a filter which, for example, processes 3×3 pixels respectively and is configured, for example, as a low pass or as a filter which carries out Gaussian smoothing. The capability of in particular recognizing small objects is thereby increased again. Together with the rectification and/or the filtering, the images can additionally be converted into grayscale images which comprise a brightness value for each pixel.

The search windows are preferably only arranged along the epipolar line of the second image. The effort for calculating a plurality of search windows can hereby be reduced since only search windows along the epipolar line of the respective object or along the epipolar line belonging to the center of the respective correlation window have to be compared with the correlation window. Search windows corresponding to the correlation window then lie, for example, on the respective epipolar line due to the rectification of the images.

The method can be repeated for all the possible correlation windows in the first image to locate a corresponding search window for every picture element (that is for the respective center point of the correlation window) so that depth information which can be entered into a depth map can be calculated for every picture element of the images (one step at a time) by means of triangulation.

A further subject of the invention is a system for the three-dimensional detection of objects having a first image detection device, a second image detection device and a computing unit. The system in accordance with the invention is characterized in that it is configured to carry out a method of the above-explained kind.

The system can preferably comprise an illumination unit which is in particular arranged between the image detection devices. The system can be set up symmetrically with respect to the illumination device. A plurality of illumination devices can also be provided. The image detection devices can be digital cameras which deliver grayscale information.

In addition, the system can also have a third camera or a third image detection device. In this case, the method is first carried out with two of the cameras, wherein here a detection of objects has already taken place in accordance with the above-described method and a depth map is produced with reference to the detected objects. The method is subsequently repeated with a further combination of the cameras to optionally supplement missing information in the depth map or missing information on objects. Such a third camera can provide advantages if shaded regions are present in the scene which are only detected by one camera, for example.

Figure 2:
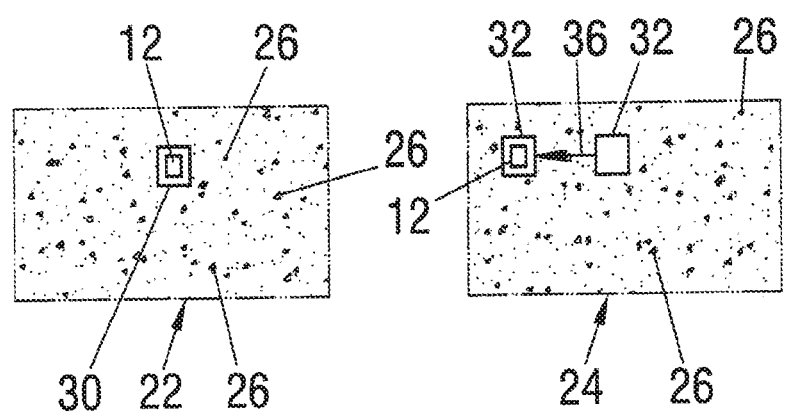
Figure 3:
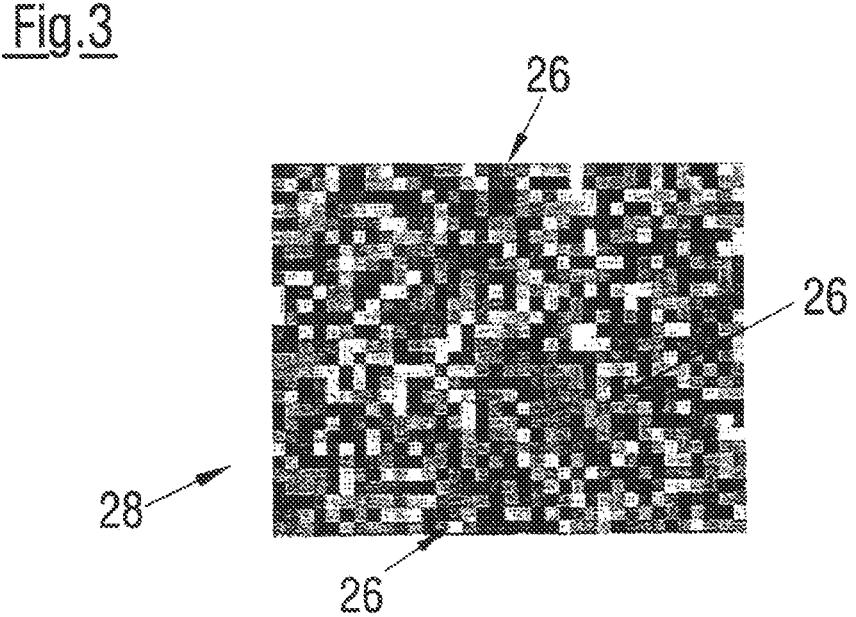
Figure 4:
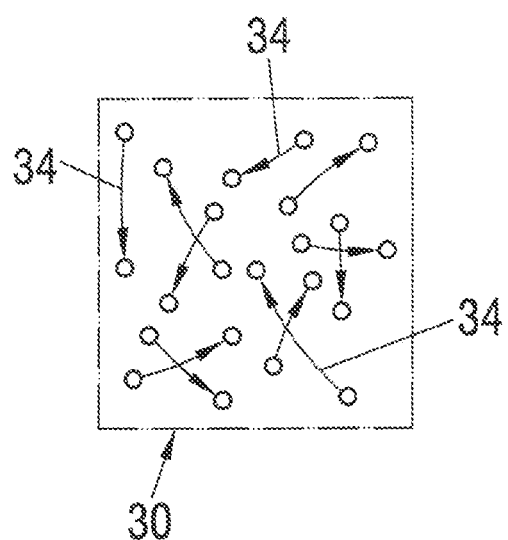

The invention will be described in the following purely by way of example with reference to the drawings. There are shown:

FIG. 1 a system in accordance with the invention for he three-dimensional detection of objects;

FIG. 2 a first image and a second image;

FIG. 3 an exemplary non-self similar illumination pattern;

FIG. 4 a rectangular correlation window; and

Figure 5:
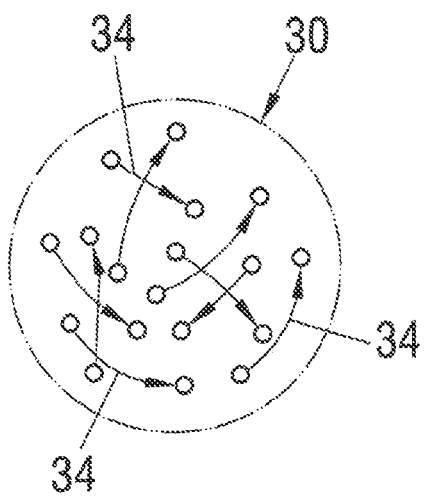

FIG. 5 a circular correlation window.

FIG. 1 shows a system 10 for the three-dimensional detection of an object 12. The system 10 has a first camera 14 and a second camera 16. The first camera 14 and the second camera 16 are directed to a scene 18 in which the object 12 is located. The scene 18 is detected by the first camera 14 from a different direction than by the second camera 16. The first camera 14 and the second camera 16 each have a viewing angle α within which the scene 18 can be detected.

An illumination device 20 which irradiates laser light in the infrared range is arranged between the cameras 14, 16. The illumination device 20 irradiates the laser light into an angular range β which is larger than the angle α. The system 10 additionally comprises a computing unit (not shown) which carries out and monitors the operation of the system 10 explained in the following.

In operation, the illumination unit 20 irradiates the scene 18, and thus also the object 12, while the first camera 14 and the second camera 16 detect images of the scene 18.

A first image 22 detected by the first camera 14 and a second image 24 detected by the second camera 16 are shown in FIG. 2. The image of the object 12 can be recognized approximately at the center in the first image 22, whereas the object 12 is displaced correspondingly further to the left in the second image 24. This displacement in the images 22, 24 is caused by the offset position of the first camera 14 relative to the second camera 16.

Illumination points 26 which are projected into the scene 18 by the illumination device 20 can be recognized in the first image 22 and in the second image 24. The illumination points 26 form a self-non similar illumination pattern 28 which is shown more exactly in FIG. 3.

The illumination pattern 28 shown in FIG. 3 shows a two-dimensional arrangement of illumination points 26 of different brightness. The illumination pattern 28 here in particular does not have any periodic structure or line pattern, but is—as mentioned—non-self similar.

The object 12 is marked by the reference numeral 12 both in the scene 18 (i.e. in the article space) and in the images 22, 24 for an easier understanding. In this respect, the reference numeral 12 in the images 22, 24 relates to the respective imaging of the object 12 there (that is to the image space of the first image 22 or to the image space of the second image 24).

A rectangular correlation window 30 is placed around the object 12 in the first image 22 in FIG. 2. A search window 32 is drawn at the point corresponding to the correlation window 30 in the second image 24. A further search window 32 is drawn around the actual position of the object 12 in the second image 24. The correlation window 30 and the search windows 32 are generally of identical structure and are shown more exactly in FIGS. 4 and 5. Only a respective correlation window 32 will be addressed in the following, but the statements apply correspondingly to the search windows 32.

FIG. 4 shows a rectangular correlation window 30 within which a plurality of point pairs 34 is drawn. The arrangement of the point pairs 34 was adapted to the illumination pattern 28 by a plurality of iterations (in accordance with the principle of trial and error) during the development of the system 10 so that particularly small objects 12 can also be easily recognized. A binarization scheme which is defined by the point pairs 34 is applied within the correlation window 30.

Each point pair 34 has a "direction" marked by an arrow for the definition of the binarization scheme, wherein the order of a comparison of the point pair is fixed by the direction. If, for example, the point or pixel at the origin of the arrow is brighter than the point at the end of the arrow, a one is produced as the result for the comparison of this point pair 34. The result of the comparison is otherwise zero.

The result of the binarization scheme is in each case a results vector for the correlation window 30 and for the search windows 32, said results vector including either a zero or a one for each pair comparison of each point pair 34, wherein the value included in the results vector is the result of the comparison of the respective point pair 34.

Such a binarization scheme can be applied either to a rectangular correlation window 30, as shown in FIG. 4, or to a circular correlation window 30, as shown in FIG. 5. Rectangular or square correlation windows and search windows can also be used in which, however, only those pixels are evaluated which are remote from the respective window center within a circle radius. The circle radius can in this respect result from the minimal object resolution in pixels.

In order, for example, to determine a search window 32 in the images 22, 24 shown in FIG. 2, the object 12 likewise being present in said search window, the binarization scheme is applied to the correlation window 30 by means of the point pairs 34 and a results vector for the correlation window is thus calculated. Every possible search window 32 is subsequently evaluated for different search windows 32 along an epipolar line 32 (which is only indicated as an arrow in FIG. 2), that is, the same binarization scheme as for the correlation window 30 is applied to every search window 32. A separate results vector is accordingly calculated for every search window 32.

That search window 32 whose results vector has the smallest Hamming distance from the results vector of the correlation window 30 is considered the search window corresponding to the correlation window, wherein it can then be assumed with a high probability that the object 12 can likewise be seen within this search window 32. The search window 32 corresponding to the correlation window 30 is accordingly the left hand search window shown in FIG. 2 which includes the object 12.

Since now the position of the object 12 is known both in the first image 22 and in the second image 24, the spacing of the object 12 from the system 10 can be determined in the scene 18 by means of a triangulation process and can be entered into a depth map. The method can be repeated accordingly for further objects (not shown).

REFERENCE NUMERAL LIST 10 system
12 object, image of the object
14 first camera
16 second camera
18 scene
20 illumination device
22 first image 24 second image
26 illumination point
28 illumination pattern
30 correlation window
32 search window
34 point pair
36 epipolar line
α viewing angle
β angular range

The invention claimed is:

1. A method for three-dimensional detection of objects, the method comprising the steps of:
   detecting a scene by means of a first image detection device, wherein a first image is produced;
   detecting the scene by means of a second image detection device, wherein a second image is produced;
   fixing a correlation window as a portion of the first image;
   fixing a plurality of search windows as portions of the second image, wherein different search windows reproduce different regions of the second image;
   determining the one of the plurality of search windows that corresponds to the correlation window by means of a correlation process,
   wherein
   in the correlation process, a binarization scheme is applied to the correlation window and to the plurality of search windows in which the respective points of at least one randomly selected point pair within the correlation window and within the plurality of search windows are compared with one another, with a respective results vector being formed for the correlation window and for the plurality of search windows;
   a correlation of the results vector of the correlation window and of the results vectors of the plurality of search windows takes place to determine the one of the plurality of search windows corresponding to the correlation window; and
   the at least one point pair is selected by means of a plurality of iterations, wherein the at least one point pair is reselected randomly for each iteration and wherein at least one point pair is used for the correlation process which achieves the best association between the correlation window and the one of the plurality of search windows corresponding to the correlation window.

2. The method in accordance with claim 1, wherein the at least one point pair is selected before the detection of the scene, with the point pair being the same for the correlation window and for each of the plurality of search windows.

3. The method in accordance with claim 1, wherein a plurality of point pairs are used which are uniformly distributed within the correlation window.

4. The method in accordance with claim 1, wherein at least 128 point pairs are selected.

5. The method in accordance with claim 1, wherein the iterations are carried out on the basis of the first image and of the second image of at least one known scene.

6. The method in accordance with claim 1, wherein the scene is illuminated with a pattern which is non-self similar at least locally.

7. The method in accordance with claim 6, wherein the illumination pattern is also varied in the iterations.

8. The method in accordance with claim 1, wherein the correlation window and the plurality of search windows each comprise the same area.

9. The method in accordance with claim 8, wherein the same area is smaller than 0.5% of the area of the first and/or second images.

10. The method in accordance with claim 8, wherein the same area is smaller than 0.1% of the area of the first and/or second images (22, 24).

11. The method in accordance with claim 8, wherein the same area is smaller than 0.01% of the area of the first and/or second images.

12. The method in accordance with claim 1, wherein the correlation window and the plurality of search windows are circular.

13. The method in accordance with claim 1, wherein the correlation of the results vector of the correlation window and of the results vectors of the plurality of search windows takes place with reference to the Hamming distance of the results vectors.

14. The method in accordance with claim 13, wherein an aggregate is formed over a plurality of Hamming distances and takes place using the aggregate of the correlation.

15. The method in accordance with claim 14, wherein the aggregate is formed over 3×3 Hamming distances.

16. The method in accordance with claim 1, wherein the first and second images are rectified and/or are filtered by a noise filter.

17. The method in accordance with claim 1, wherein the plurality of search windows are only arranged along an epipolar line of the second image.

18. A system for three-dimensional detection of objects, the system comprising
   a first image detection device configured to detect a first scene and produce a first image;
   a second image detection device configured to detect a second scene and produce a second image; and,
   a computing unit configured to:
   fix a correlation window as a portion of the first image;
   fix a plurality of search windows as portions of the second image, wherein different search windows reproduce different regions of the second image;
   determine the one of the plurality of search windows that corresponds to the correlation window by means of a correlation process,
   wherein
   in the correlation process, a binarization scheme is applied to the correlation window and to the plurality of search windows in which the respective points of at least one randomly selected point pair within the correlation window and within the plurality of search windows are compared with one another, with a respective results vector being formed for the correlation window and for the plurality of search windows;
   a correlation of the results vector of the correlation window and of the results vectors of the plurality of search windows takes place to determine the one of the plurality of search windows corresponding to the correlation window; and
   the at least one point pair is selected by means of a plurality of iterations, wherein the at least one point pair is reselected randomly for each iteration and wherein at least one point pair is used for the correlation process which achieves the best association between the correlation window and the one of the plurality of search windows corresponding to the correlation window.

\* \* \* \* \*